US010228295B2

(12) United States Patent
Villate et al.

(10) Patent No.: US 10,228,295 B2
(45) Date of Patent: Mar. 12, 2019

(54) SELF-CALIBRATING CALORIMETER USING ELECTRICAL SUBSTITUTION

(71) Applicant: Commissariat à l'énergie atomique et aux énergies alternatives, Paris (FR)

(72) Inventors: Denis Villate, Baron (FR); Marco Soscia, Poisy (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 699 days.

(21) Appl. No.: 14/414,836

(22) PCT Filed: Jul. 23, 2013

(86) PCT No.: PCT/EP2013/065471
§ 371 (c)(1),
(2) Date: Jan. 14, 2015

(87) PCT Pub. No.: WO2014/016273
PCT Pub. Date: Jan. 30, 2014

(65) Prior Publication Data
US 2015/0192480 A1 Jul. 9, 2015

(30) Foreign Application Priority Data
Jul. 24, 2012 (FR) .................................. 12 57166

(51) Int. Cl.
G01K 19/00 (2006.01)
G01K 17/04 (2006.01)
G01K 17/00 (2006.01)

(52) U.S. Cl.
CPC ........... *G01K 19/00* (2013.01); *G01K 17/003* (2013.01)

(58) Field of Classification Search
CPC .... G01K 17/00; G01K 17/006; G01K 15/005; G01K 17/04; G01K 19/00; G01N 21/274
(Continued)

(56) References Cited

U.S. PATENT DOCUMENTS 4,033,186 A * 7/1977 Bresie ..................... E21B 47/06
374/E1.003
4,158,810 A * 6/1979 Leskovar ............... G01R 15/26
324/127
(Continued)

FOREIGN PATENT DOCUMENTS

CH       694899   *  8/2005
CN       1176463 A *  3/1998
(Continued)

OTHER PUBLICATIONS

Search Report issued in French Patent Application FR 12 57166 dated May 7, 2013.
(Continued)

*Primary Examiner* — Gail Kaplan Verbitsky
(74) *Attorney, Agent, or Firm* — Pearne & Gordon LLP

(57) ABSTRACT

The invention relates to a self-calibrating calorimeter using electrical substitution comprising means for measuring a plurality of physical values of different types and of different levels. The calorimeter according to the invention comprises a single acquisition card comprising, for each value to be measured, an independent acquisition system comprising processing circuits specific to the value measured.

2 Claims, 7 Drawing Sheets

(58) Field of Classification Search
USPC ....... 374/31–39, 10–12, 1, 44, 45, 183, 4, 5; 422/51; 436/147; 702/99
See application file for complete search history.

(56) References Cited

U.S. PATENT DOCUMENTS

| | | | | |
|---|---|---|---|---|
| 4,922,443 | A * | 5/1990 | Coetsier | G01M 17/007 701/99 |
| 6,331,075 | B1 * | 12/2001 | Amer | G01N 25/18 374/44 |
| 6,865,241 | B1 * | 3/2005 | Adkins | G06F 13/4059 375/372 |
| 7,026,828 | B2 * | 4/2006 | Pasty | G01D 21/02 324/605 |
| 7,194,369 | B2 * | 3/2007 | Lundstedt | G01N 21/274 702/104 |
| 7,411,533 | B2 * | 8/2008 | Posamentier | H03M 1/1225 341/122 |
| 8,050,881 | B1 * | 11/2011 | Yeung | A61B 5/0024 370/503 |
| 2002/0163333 | A1 | 11/2002 | Schlicker | |
| 2003/0014209 | A1 * | 1/2003 | Arnaout | G06F 11/2294 702/122 |
| 2004/0264581 | A1 * | 12/2004 | Perry | G01L 25/00 375/257 |
| 2005/0018178 | A1 | 1/2005 | Schloss | |
| 2008/0164429 | A1 | 7/2008 | Spinicchia | |
| 2011/0013663 | A1 * | 1/2011 | Garden | G01N 25/4866 374/11 |
| 2011/0243188 | A1 * | 10/2011 | Aberra | G01K 7/12 374/171 |
| 2013/0156070 | A1 * | 6/2013 | Reich | G01K 1/026 374/179 |
| 2014/0342122 | A1 * | 11/2014 | Inglis | C23C 16/01 428/141 |
| 2016/0252408 | A1 * | 9/2016 | Chainer | G01K 7/427 374/1 |

FOREIGN PATENT DOCUMENTS

| | | | |
|---|---|---|---|
| CN | 2904152 Y | * | 5/2007 |
| CN | 201130369 Y | * | 10/2008 |
| CN | 101308171 A | * | 11/2008 |
| CN | 101701879 A | * | 5/2010 |
| CN | 101871984 A | * | 10/2010 |
| CN | 101451917 B | * | 6/2011 |
| CN | 102262166 A | * | 11/2011 |
| CN | 103149395 A | * | 6/2013 |
| FR | 299398 A1 | * | 7/2012 |

OTHER PUBLICATIONS

International Search Report issued in Application No. PCT/EP2013/065471 dated Jul. 7, 2014.
Written Opinion issued in Application No. PCT/EP2013/065471 dated Jul. 7, 2014.
M. Soscia, "Calorimetrie laser: mesure de forte puissances laser", Bulletin du Bnm, No. 82, Oct. 1990.
F. Uchiyama et al., "A 10 kW class calorimeter for CW-O2 laser power measurements", CPEM '88 Digest.

* cited by examiner

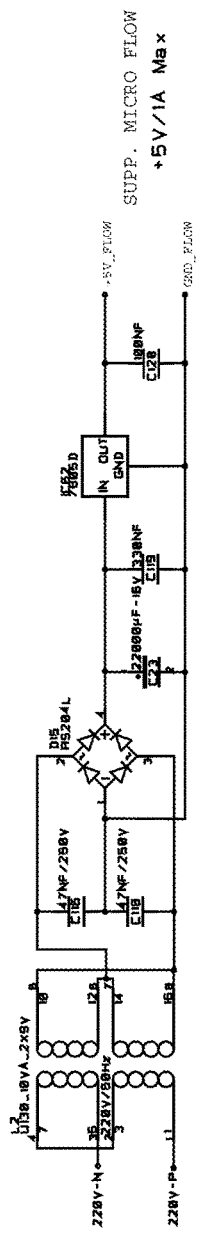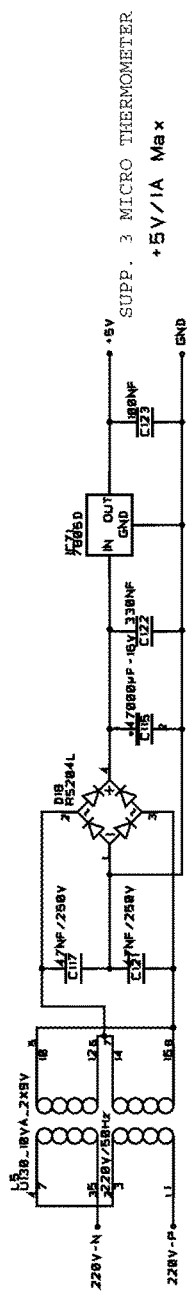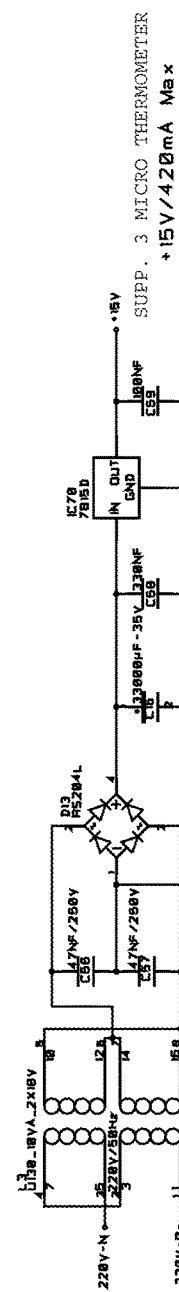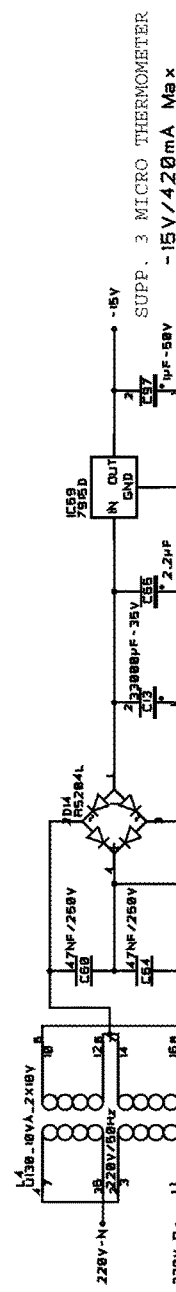
FIG. 7

SELF-CALIBRATING CALORIMETER USING ELECTRICAL SUBSTITUTION

TECHNICAL FIELD

The invention relates to the field of measuring powers and relates more specifically to a self-calibrating calorimeter using electrical substitution comprising means for measuring a plurality of physical values of different types and of different levels.

The invention also relates to a device for calibrating the calorimeter according to the invention comprising a resistive heating element, a source of cooling water, a source of series regulated voltage intended to provide electrical power to the heating element, at least one voltmeter intended to measure the voltage at the terminals of said source, a first thermometer and a second thermometer intended to measure the temperature of the cooling water respectively at the inlet and at the outlet of said calorimeter, a frequency meter intended to measure the cooling water flow.

The invention also relates to a method for calibrating such a calorimeter.

PRIOR ART

The calorimeters of prior art used to measure powers, in particular laser, are generally provided with several measuring apparatuses each dedicated to a particular physical value, such as for example the supply voltage or the temperature of the calorimeter or encore the cooling water flow of said calorimeter.

FIG. 1 diagrammatically shows an acquisition system used in a self-calibrating calorimeter 2 of prior art comprising a resistive heating element 4 wound around the calorimeter 2, a first voltmeter 6 intended to measure the supply voltage delivered by a source 8 to the resistive element 4, a second voltmeter 10 intended to measure the voltage at the terminals of a low-resistive standard shunt resistor 12 placed in series in the power supply circuit of the heating element 4 and intended to measure the supply current passing through this resistive element 4. The calorimeter of FIG. 1 further comprises a water inlet 14 connected to a turbine 16 intended to provide the cooling water of the calorimeter 2, and an outlet 18 intended to evacuate the cooling water after passing in the calorimeter 2. The turbine 16 is suited to deliver a frequency that is proportional to the flow of cooling water.

The variation in the temperature of the calorimeter 2 is measured by a first platinum resistance thermometer 20 connected to a first thermometer 22 and a second platinum resistance thermometer 24 connected to a second thermometer 26.

In order to calibrate this calorimeter the laser power that it is sought to measure is simulated by dissipating by the Joule effect a well-known corresponding electrical power in the resistive heating element 4 in such a way as to best reproduce the thermal effects resulting from the optical absorption of the beam. The operating principle is described hereinbelow.

For an electrical power dissipated in the resistive element 4, the increase in the temperature Tc (° C.)–Tf (° C.) of the water is measured at the outlet of the calorimeter for a cooling flow Q (l/min). The results obtained show that the dissipated electrical power Pe is proportional, to the nearest heat losses, to the product of the increase in temperature by the flow Q: Pe=C×(Tc–Tf)×Q, with the proportionality coefficient C representing the experimental value of the contained heat volume of the water for which the theoretical value at 20° C. is equal to 0.0695 kw/[° C.×(l/min)].

The electrical power is generated by a supply source 8 with rectified filtered and regulated series regulation, of which the power supplied can be measured with precision using the simple relationship Pe (W)=V (Volt)×I (Ampere), where V is the voltage in volts measured directly at the terminals of the power source 8 using the voltmeter 6, I is the current in amperes measured by the intermediary of the standard shunt 12. The voltage drop at the terminals of the standard shunt 12 is measured using the voltmeter 10. The flow of water cooling the calorimeter Q (l/min) is measured using the turbine 16 which generates a frequency signal in Hz. This measurement is taken using a frequency meter 28.

Each of the instruments used to take the measurements described hereinabove is connected to a processing unit 30 that centralises and saves all of the data. The interfaces used can be of the IEEE parallel type, serial RS232, RS 422, RS 485, USB or of the Ethernet network type.

A disadvantage of the acquisition system of FIG. 1 stems from the fact that the measurements are taken by five instruments of three different types each requiring a specific communications protocol with the processing unit 30. This acquisition system can be simplified by using central data acquisition systems or multiplexed voltmeters that use a single microprocessor or a single microcontroller which using multiplexing receives signals which are of very different types (temperature, frequency and voltage) or even of very different levels. Indeed, a voltage to be measured of several hundred volts can switch to a voltage to be measured of a few tens of millivolts. If the precision desired for the measurements is high, the option that uses multiplexing is not very compatible with rapid measurements with high resolutions and with low noise. It is then preferable to retain five separate instruments each dedicated to a single value to be measured.

The instruments used in the acquisition system of FIG. 1 could also be replaced with dedicated instrumentation cards, installed on the bus PCI (for Peripheral Component Interconnect) of a computer. This solution is also not very compatible with high-resolution low signal-to-noise measurements which can also be very different (the PCI bus is powered by a switch-mode power supply that is not very compatible with high metrological performance).

A purpose of the invention is to overcome the disadvantages of prior art described hereinabove.

DESCRIPTION OF THE INVENTION

The invention consists in replacing all of the conventional measuring instruments used in an acquisition system or possibly several acquisition and processing cards plugged into the PCI bus (Peripheral Component Interconnect) of a computer with a single electronic acquisition card that has onboard specific and optimised solutions for the different values to be measured.

The self-calibrating calorimeter according to the invention comprises a single acquisition card comprising, for each value to be measured, an independent acquisition system comprising processing circuits specific to the value measured.

According to the invention, each independent acquisition system comprises a microcontroller dedicated to processing the value to be measured.

Preferentially, the microcontrollers of the different independent acquisition systems are connected via a common serial data bus to a master microcontroller connected to a processing unit.

The device for calibrating the calorimeter according to the invention comprises, for each physical value to be measured, an independent acquisition system comprising processing circuits specific to the value measured.

The method for calibrating the calorimeter according to the invention consists in measuring and in processing each physical value in an independent acquisition system comprising processing circuits specific to the value measured.

BRIEF DESCRIPTION OF THE DRAWINGS

Other characteristics and advantages of the invention shall result from the following description, taken by way of a non-restricted example, in reference to the annexed figures, wherein:

FIGS. 7a to 7d show the electrical diagrams of the different supply sources used by the calorimeter according to the invention.

DETAILED DESCRIPTION OF PARTICULAR EMBODIMENTS

In the following description, identical references shall designate the elements that are common to the various figures.

Figure 1:
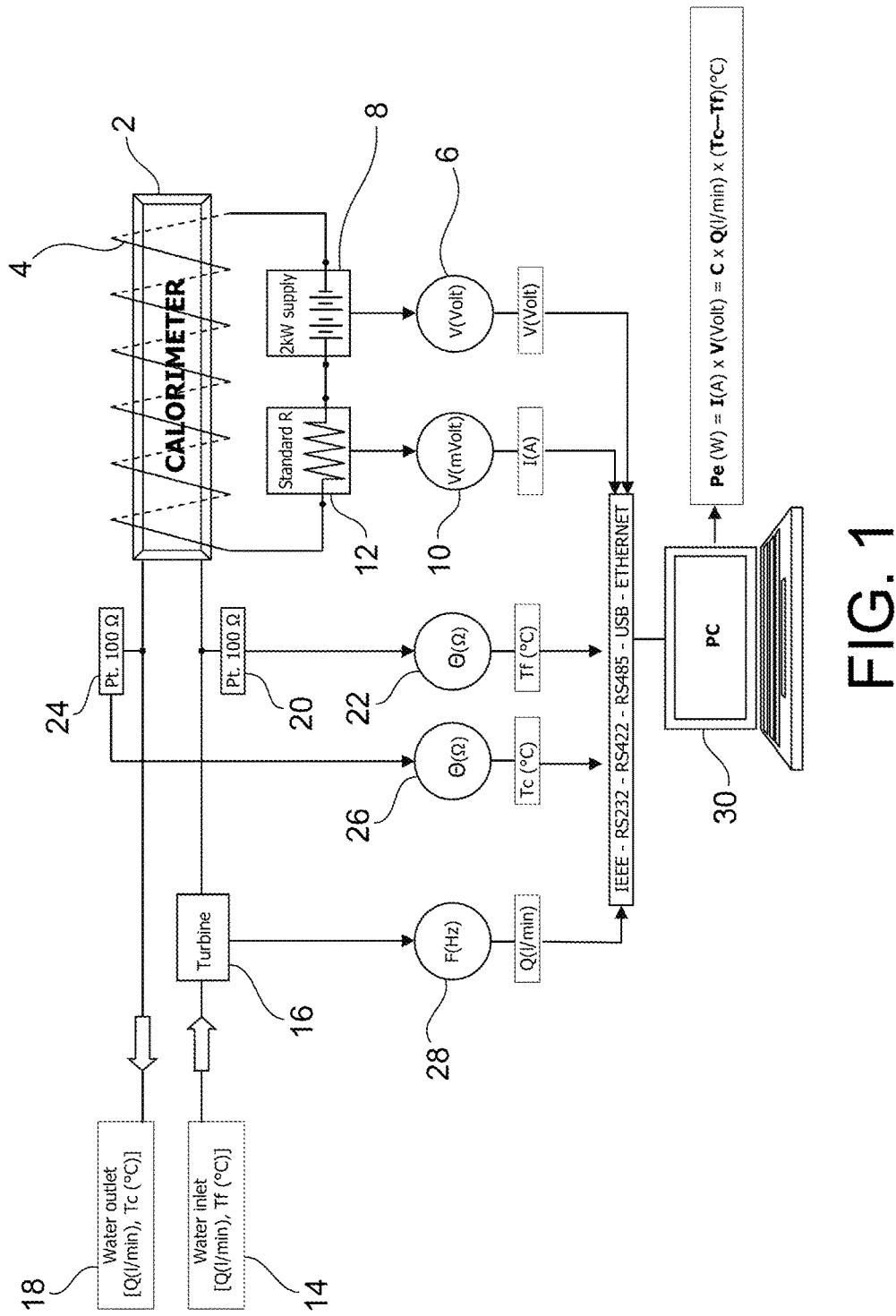
FIG. 1 diagrammatically shows an acquisition system of prior art.

FIG. 1 described previously diagrammatically shows an acquisition system for measuring various physical values during the simulation of a laser power to be measured by dissipation of an equivalent electrical power in a resistive element.

Figure 2:
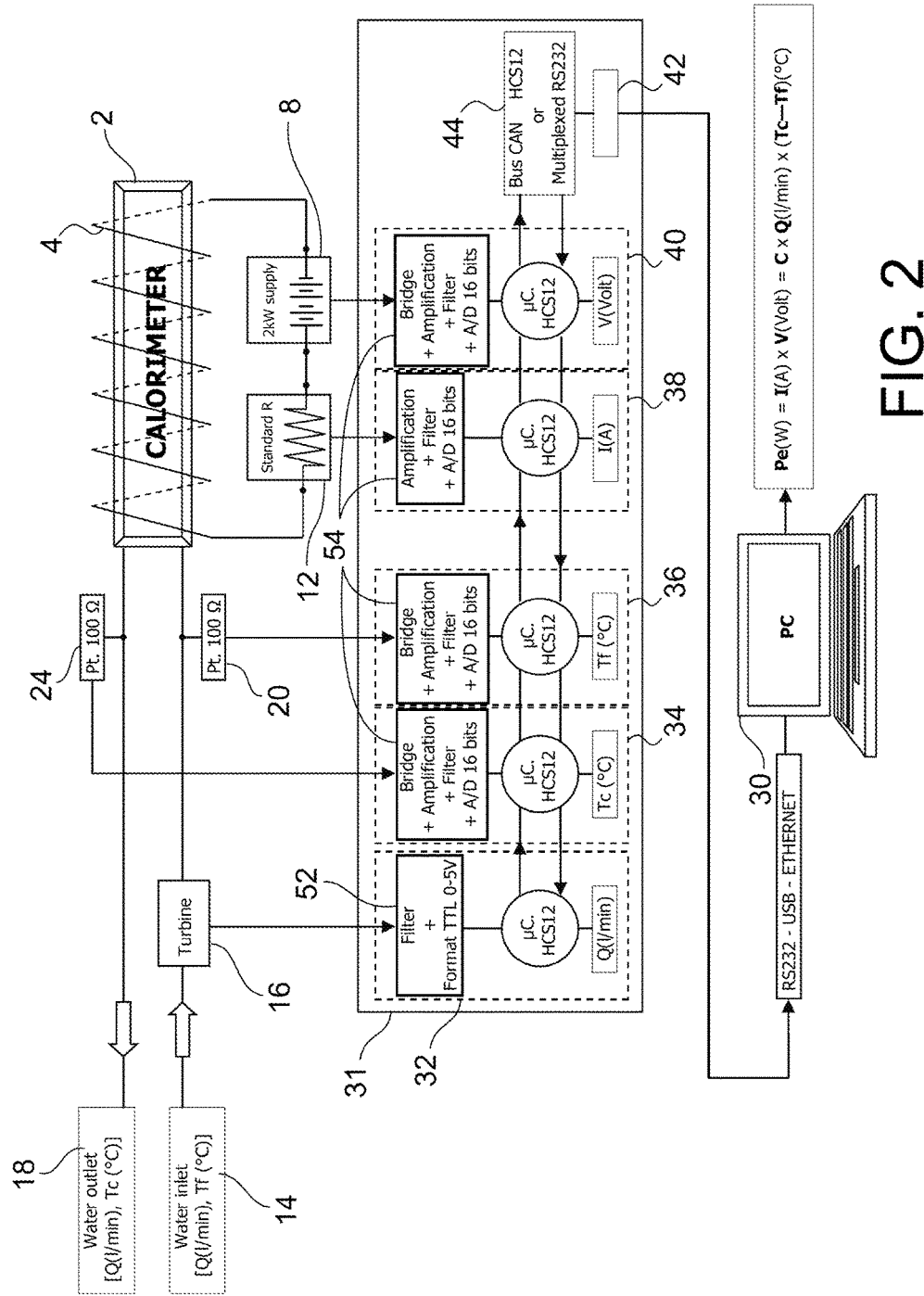
FIG. 2 diagrammatically shows an acquisition system according to the invention.

In FIG. 2, all of the measuring instruments used in the acquisition system of FIG. 1 are on board a single electronic card 31 comprising five independent acquisition systems 32, 34, 36, 38, and 40 each capable of processing, digitising and measuring, simultaneously and constantly, a single physical value without them being disturbed by multiplexing on the different acquisition lines for different signals. Only the digital data transfer is multiplexed to a master microcontroller 42 by the intermediary of a common serial bus 44 of the CAN or RS232 type. This multiplexing does not have any disturbing effect on the various analogue signals. Only the master microcontroller 42 which centralises the digital data is interfaced with the processing unit 30 which handles saving and processing the data.

Each one of these independent acquisition systems 32 to 40 comprises a signal conditioning module dedicated to the physical value measured and a microcontroller dedicated to processing the data relating to this physical value.

In the embodiment shown in FIG. 2, the first acquisition system 32 comprises a module 52 for filtering and formatting the frequency signal delivered by the turbine 16, the acquisition systems 34 to 40 each comprise a module 54 comprising an amplification bridge, a filter and a 16-bit analogue-to-digital converter. Furthermore, each one of said acquisition systems 32 to 40 comprises a 16 bits/25 MHz Freescale HCS12 microcontroller 55. Other microcontrollers can of course be used without leaving the scope of the invention.

The calibrating of the calorimeter of FIG. 2 is carried out by the following steps:

simulating the power of a laser beam to be measured by dissipating by the Jouel effect an electrical power corresponding to said last power on the heating element 4 is such a way as to reproduce the thermal effects resulting from the optical absorption of said laser beam, measuring the electrical power dissipated in the heating element 4 according to the variation in the temperature of a given quantity of cooling water between the inlet 14 and the outlet 18 of the calorimeter, treat each physical value measured independently in the independent acquisition system which is dedicated to it by means of processing circuits specifically dedicated to the value measured.

In the embodiment of FIG. 2, the processing circuits specific to each value use high-precision passive and active components, with a very low offset, very low noise and very low thermal drift. The operational amplifiers used as a follower and active filter components have a shift in their offsets of 0.1 $\mu V/°$ C. The voltage amplifiers used have a non-linearity of 0.005% on their amplification range and an offset in temperature of 5 ppm/° C. The references of the voltages used have an error of ±0.02% and an offset in temperature of 2 ppm/° C. The resistances used in the measurement bridges and for the calibration circuits have an error of ±0.01% and an offset in temperature of 2 ppm/° C. The 16-bit analogue-to-digital converters used are fast and have a shift in temperature of their offset of 3 ppm/° C. The specific solutions that use these components are dedicated and optimised for each one of the signals to be measured.

In operation, the temperature of the water at the inlet of the calorimeter Tf is measured using a platinum resistance thermometer Pt100, the difference in temperature between the water outlet and inlet of the calorimeter, (Tc−Tf) is to be measured using two platinum resistance thermometers placed respectively at the inlet and at the outlet of the calorimeter, the flow of water Q cooling the calorimeter is measured using a propeller turbine, the current I and the voltage V are measured in order to determine the electrical power dissipated by the Joule effect in the calorimeter and the temperature of the water at the inlet of the calorimeter is measured with a true resolution of 0.001° C. using the 100-ohm platinum resistance thermometer 20, Pt100, which makes it possible to obtain in association with a conventional thermometer of a metrological nature a true resolution of 0.01° C.

In light of the objectives to be achieved in terms of final precision on the measurement of the power (1%) which is the equivalent i terms of resolution in temperature of 0.007° C., it is suitable to increase the resolution of these measurements, all the more so that in the end the difference in temperature will degrade the available resolution from 0.01° C. to a few 0.01° C. The temperature is deduced from the resistance value of the platinum resistance by the relationship: R(T)=100×(1+3.9083×10−3×T−5.775×10−7×T²). The value R(T) is deduced from the voltage drop at the terminals of a high-precision divider bridge. The e.m.f. (electromotive force) that corresponds to this voltage drop is amplified and filtered before being digitised using a 10V/16 bits ADC (analogue-to-digital converter). The corresponding electronic diagram is shown in FIG. 3.

In order to increase the resolution beyond 0.01° C., it is suitable to restrict the range of measurement available and to increase the sensitivity in this restricted range until reaching 450 µV for 0.001° C., which is three timers the resolution of the ADC used (10V over 16 bits=150 µV). Between 10° C. and 50° C., a true resolution of 0.001° C. on the temperature measurements is as such observed. On the other hand to check the stability of these measurements over time, means for calibrating the gain of the voltage amplifier using a divider bridge provided with high-precision metal resistors (0.01%) are onboard the electronic card 31. The gain of the amplifier measured periodically has a stability of about 0.01%.

Figure 3:
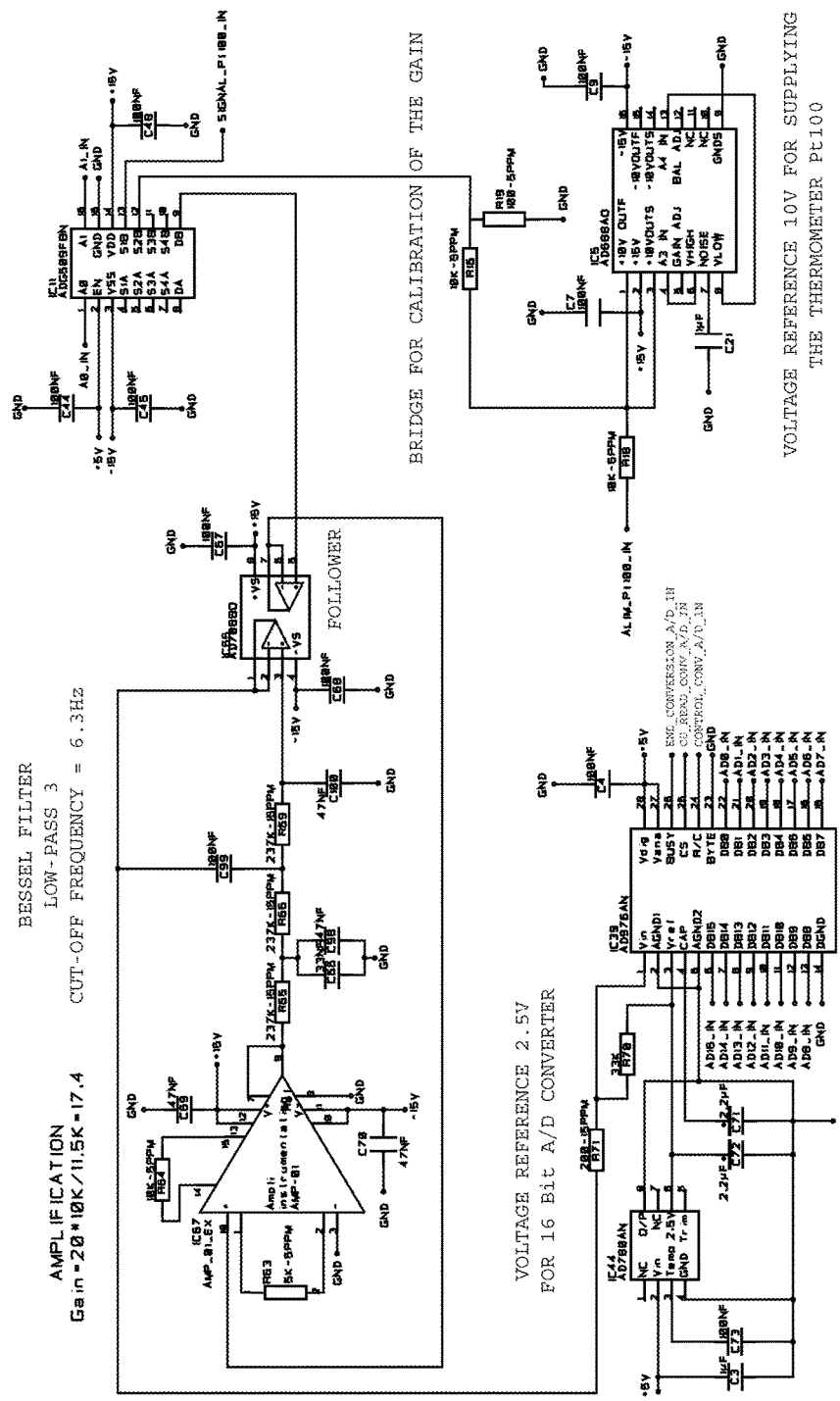
FIG. 3 shows an electrical diagram of the device for measuring the temperature at the inlet or at the outlet of the calorimeter.
Figure 4:
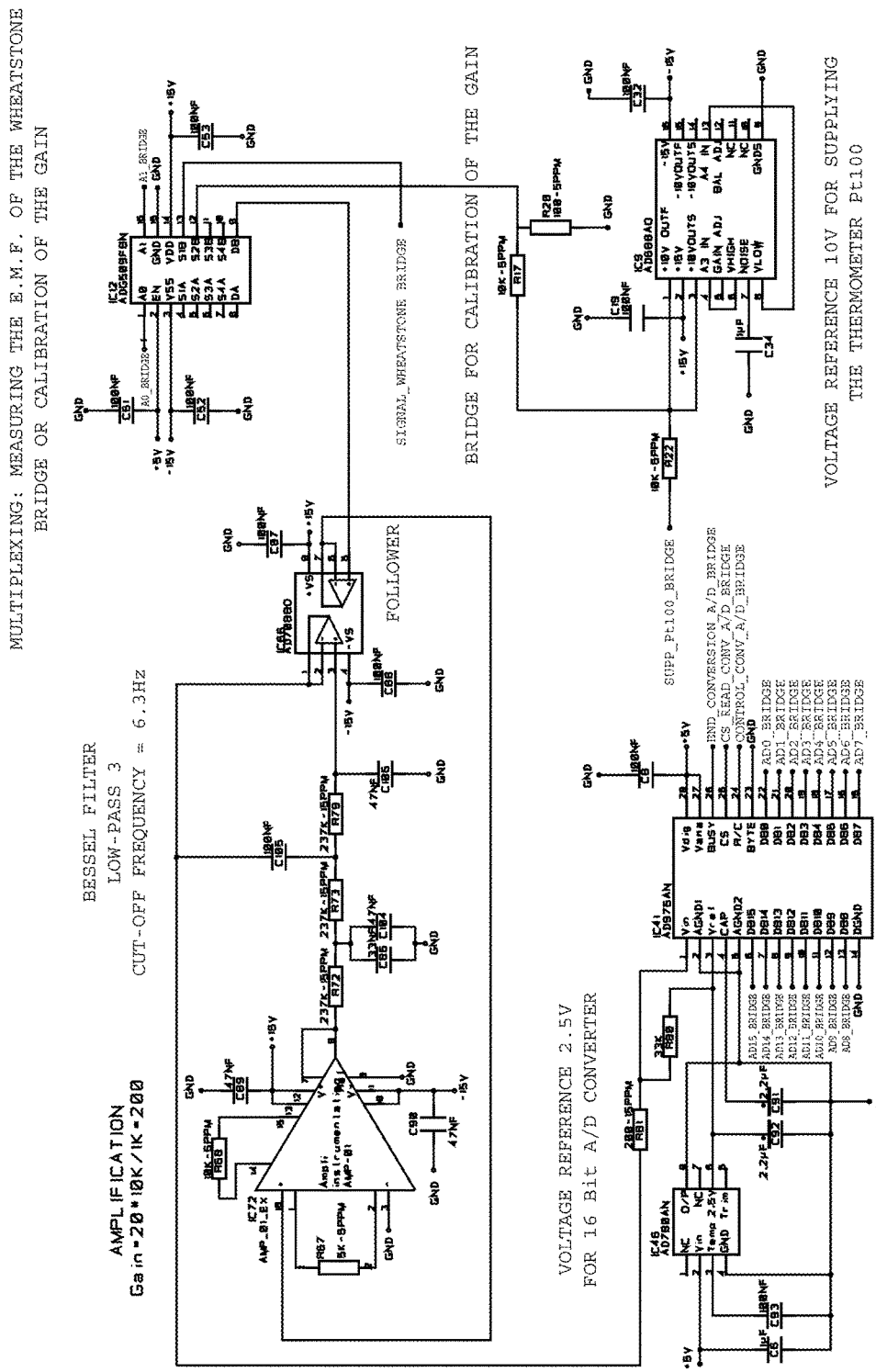
FIG. 4 shows a diagram of a Wheatstone bridge for measuring the difference in temperature between the outlet and the inlet of the calorimeter according to the invention.
Figure 5:
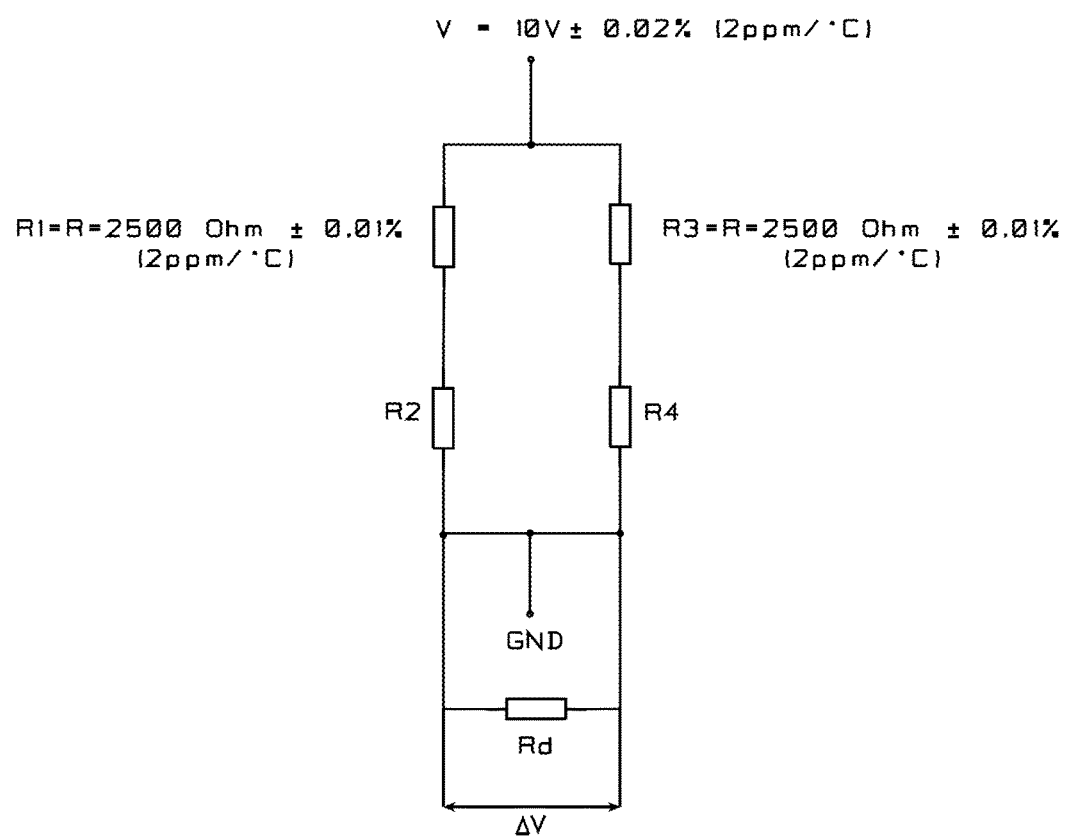
FIG. 5 shows an electrical diagram of the device for measuring the difference in temperature using the Wheatstone bridge.

By using the electronic diagram of FIG. 3 respectively on the thermometer Pt100 placed at the water outlet 18, and on the thermometer Pt100 placed at the water inlet 14, in order to measure the increase in temperature, a degradation in the resolution is observed at a few 0.001° C. In order to retain a resolution of 0.001° C. on the temperature difference two resistances Pt100 are placed respectively at the inlet ($R_f$) and at the outlet ($R_c$) of the calorimeter through a Wheatstone bridge shown in FIG. 4. A macro sensor that generates an e.m.f. is as such created. The difference in temperature to be measured is expressed according to this e.m.f. through a relationship which also involved the other parameters of the bridge and in particular the temperature $T_f$ at the inlet of the calorimeter 2 which is measured separately as described in the preceding paragraph. The e.m.f. generated is amplified and filtered before being digitised using a 10V/16 bits ADC, in accordance with the diagram of FIG. 5.

As previously, the sensitivity is substantially increased over a limited temperature range: from 10° C. to 50° C., and thermal noise less than 0.001° C. and a true resolution of 0.001° C. on the difference in temperature to be measured are as such obtained. In the end an equivalent resolution in power that can be measured equal to 0.25 W is obtained, which is 0.01% of the electrical power for calibration at 2 kW.

If we consider that RI=R3=R=2500Ω (Current regulating resistors), R2=$R_c$=$R_f$+ΔR
(Resistance of the thermometer at the outlet of the calorimeter),
$R_4$=$R_f$ (Resistance of the thermometer at the inlet of the calorimeter), then:

$$\frac{\Delta V}{R_d} = \left[\frac{R_2 R_3 - R_1 R_4}{R_1 R_4 (R_2 + R_3) + R_2 R_3 (R_1 + R_4) + R_d (R_1 + R_2)(R_3 R_4)}\right] V_0$$

If we consider that the resistors Ri are negligible in light of the input impedance of the measuring circuit Rd, equation (1) becomes:

$$\frac{\Delta V}{R_d} = \frac{R_2 R_3 - R_1 R_4}{(R_1 + R_2)(R_3 R_4)} V_0$$

The resistors $R_c$ and $R_f$ are expressed according to the dependence in temperature:

$R_c = R_o[I + AT_c + BT_c^2]$ and $R_f = R_o[I + AT_F + BT_F^2]$
with: $R_0$=100Ω, A=3.9083 $10^{-3\circ}$ C.$^{-1}$,
B=−5,775 $10^{-7\circ}$ C.$^{-2}$ By combining the preceding equations, the second degree equation is obtained of which ΔT is the solution:

$$\Delta T^2 + \left(\frac{A}{B} + 2T_F\right)\Delta T - \frac{\Delta v}{R_0 B}\frac{(R + R_F)^2}{RV_0 - \Delta V(R + R_F)^2} = 0$$

The flow measurements are taken using a very high quality propeller turbine which delivers a frequency that is proportional to the instantaneous flow. This type of turbine operates via magnetic induction. A permanent magnet inserted into the propeller induces a sinusoidal electrical signal of which the frequency is proportional to the rotation frequency of the propeller. The magnetic induction can unfortunately be disturbed by fluctuations and harmonics through the public power grid. In order to overcome these disturbances, the signal induced is framed by two active linear filters of the BESSEL type respectively high-pass 4 and low-pass 4.

Figure 6:
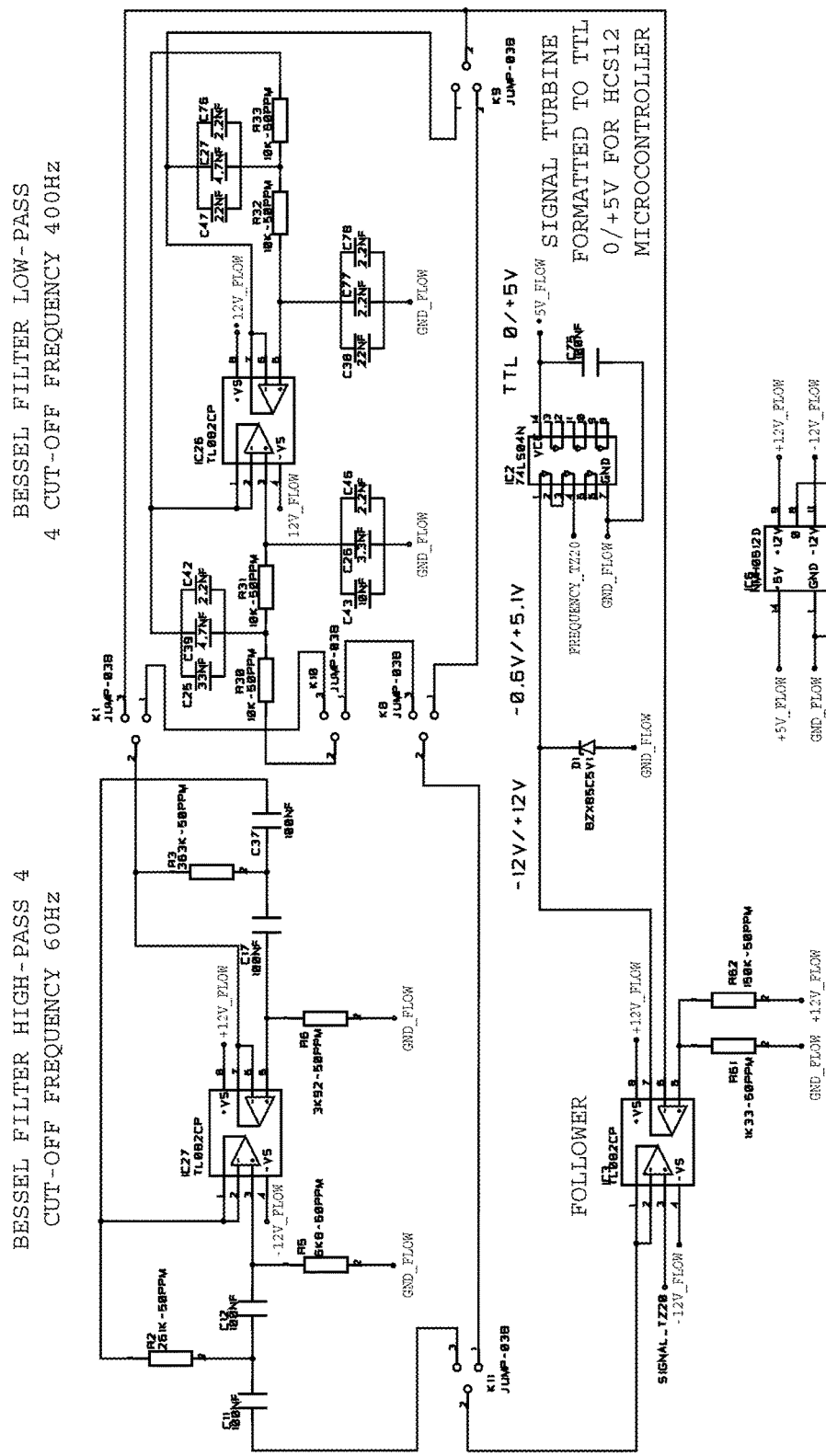
FIG. 6 is an electrical diagram of a circuit for measuring the flow of cooling water of the calorimeter according to the invention.

FIG. 6 shows the electrical diagram of such a filter. The true resolution obtained as such on the flow is equal to 0.001 liter/minute.

FIGS. 7a to 7d show the electrical diagrams of the supplies of the previously described electronic functions. The latter are of the rectified linear type, substantially filtered and regulated. They offer low residual ripples of a few millivolts on ±15 V and comprise two different and decoupled analogue grounds; GND and GND_DEBIT, which make it possible to galvanically insulate the low continuous signals of the same type (the temperatures) of the sinusoidal frequency signal delivered by the turbine 16.

In order to access the electrical power dissipated by the Joule effect the voltage and the corresponding current must be measured. To this effect, shunts or standard resistors with very low uncertainty (0.01%) and with very low dependency in temperature (a few ppm/° C.) are used. These shunts and resistors can be directly on board the electronic card 31, which can constitute a certain advantage in terms of integration.

Thanks to the device of the invention, the independent measuring instruments, voltmeters, frequency meter and thermometers are replaced with a single onboard card 31 which comprises as many independent processing channels as there are physical values to be measured. A solution that is easy to integrate for a low final cost is as such obtained. This card can be onboard with the object that has to be instrumented, which can be important in terms of portability for the application. Furthermore, each one of the channels is built using electronic solutions that are specific and optimised pour to obtain the best final result on the value to be measured. High-performance components can be combined therein on a case-by-case basis according to need.

Note moreover that the card 31 can carry its own serial regulation linear supplies that perfectly dedicated to metrology and which can have decoupled analogue grounds if the signals to be exploited so require. It can also carry the calibration circuits for measuring and controlling over time the gains of the different amplifier used. As such, associate automatic calibration procedures, available at any time, can be used. In addition, each one of the channels uses a dedicated microcontroller wherein will be programmed the independent software code (compiled in assembler) specific to its application. The connection with an external computer is reduced to a single serial interface of the RS232, RS422, RS485, USB or Ethernet type, by the intermediary of a master microcontroller. This same master microcontroller can furthermore be interfaced with various external devices, such as alphanumerical displays without it being necessary to use a computer to read the results.

The invention claimed is:

1. Device for calibrating a laser calorimeter using electrical substitution, said laser calorimeter comprising a single acquisition card adapted for measuring a plurality of physical values of different types and of different levels, wherein each value is measured by an independent acquisition system, the device comprising a heating element, a source of cooling water, a source of series regulated voltage intended to provide electrical power to the heating element, at least one voltmeter intended to measure the voltage at the terminals of said source, at least one thermometer intended to measure the temperature of the cooling water respectively at the inlet and at the outlet of said calorimeter, and a frequency meter intended to measure the flow of the cooling water, for each physical value to be measured, each independent acquisition system comprising a processing circuit dedicated to and specific to the value measured and a microcontroller dedicated to processing the value to be measured, said device for calibrating a calorimeter comprising at least two resistors arranged respectively at the input and at the output of said calorimeter through a Wheatstone bridge so as to realize temperature measurements at high resolutions and low signal-to-noise ratio.

2. Device according to claim 1 wherein the microcontrollers of the different independent acquisition systems are connected to a master microcontroller connected to a processing unit via a common serial data bus.

* * * * *